United States Patent [19]

Schmidt

[11] 4,027,476

[45] June 7, 1977

[54] COMPOSITE CATALYST BED AND METHOD FOR MAKING THE SAME

[75] Inventor: Eckart W. Schmidt, Bellevue, Wash.

[73] Assignee: Rocket Research Corporation, Redmond, Wash.

[22] Filed: Oct. 15, 1975

[21] Appl. No.: 622,607

Related U.S. Application Data

[63] Continuation of Ser. No. 406,700, Oct. 15, 1973, abandoned.

[52] U.S. Cl. .................. 60/218; 23/288 R; 23/288 F; 60/299; 60/300; 60/303; 181/71; 252/477 R; 252/477 Q; 60/39.82 C
[51] Int. Cl.² ............... C06D 5/04; B01J 8/00; B01J 35/04
[58] Field of Search ............ 60/218, 303, 299, 300, 60/39.82 C; 252/477 R, 477 Q; 23/288 R, 288 F; 75/DIG. 1; 181/71

[56] References Cited

UNITED STATES PATENTS

| | | | |
|---|---|---|---|
| 2,288,943 | 7/1942 | Eastman | 23/288 F |
| 2,627,531 | 2/1953 | Vogt | 75/DIG. 1 |
| 3,083,524 | 4/1963 | Dosie | 23/288 F |
| 3,135,703 | 6/1964 | Sill | 23/288 R |
| 3,136,125 | 6/1964 | Toone et al. | 60/39.82 C |
| 3,169,836 | 2/1965 | Davis | 181/71 X |
| 3,295,919 | 1/1967 | Henderson et al. | 23/288 F |
| 3,298,182 | 1/1967 | Webb | 60/218 X |
| 3,303,651 | 2/1967 | Grant, Jr. et al. | 60/203 |
| 3,495,950 | 2/1970 | Barber et al. | 181/71 X |
| 3,503,212 | 3/1970 | Jennings et al. | 60/218 X |
| 3,521,429 | 7/1970 | Leffler | 181/71 X |
| 3,526,602 | 9/1970 | Kobayashi et al. | 252/477 R |
| 3,581,490 | 6/1971 | Morris | 60/300 |
| 3,587,669 | 6/1971 | Vabo | 23/288 R |
| 3,652,317 | 3/1972 | Porta et al. | 23/288 R |
| 3,660,024 | 5/1972 | Gillespie | 252/477 R |
| 3,769,240 | 10/1973 | Lew et al. | 252/477 R |
| 3,841,841 | 10/1974 | Torosian | 181/71 X |
| 3,884,037 | 5/1975 | Barber et al. | 181/71 X |

Primary Examiner—Leland A. Sebastian

[57] ABSTRACT

A composite catalyst bed comprising a foam metal matrix packed with a plurality of catalyst particles. The foam metal matrix is a three dimensional, structurally rigid network of interconnected ligaments which define a plurality of interconnected pores filled by particles of a suitable catalyst, such as Shell 405. The composite structure is made by first filling the foam metal matrix with the catalyst particles and then compressing the same so that the catalyst particles become packed tightly in the matrix, with some of the catalyst particles being formed into the ligaments of the matrix. The composite catalyst bed is shown in a monopropellant reactor to decompose hydrazine based monopropellants, and also in a catalytic muffler to oxidize exhaust combustion products from an internal combustion engine. The foam metal matrix retains the catalyst particles in place to alleviate attrition of the particles, and also provides good thermal conductivity to improve performance of the catalyst.

46 Claims, 12 Drawing Figures

COMPOSITE CATALYST BED AND METHOD FOR MAKING THE SAME

This is a continuation of application Ser. No. 406,700, filed Oct. 15, 1973, now abandoned.

BACKGROUND OF THE INVENTION

1. Field of the Invention

The present invention relates to a catalyst structure, such as those used in monopropellant reactors and those used to oxidize the combustion products from an automobile exhaust, and also to a method of making such catalyst structure.

2. Description of the Prior Art

Catalytic reactors are used in monopropellant rockets for attitude control of spacecraft, and in that application have to operate in pulse-mode, with possibly more than one million cycles per engine. Catalytic reactors also being considered for use as catalytic exhaust convertors for automobiles, where the catalytic reactor becomes exposed to pressure pulsations each time a cylinder exit valve of the automobile engine opens. Thus the number of pressure pulsations throughout the lifetime of the catalytic exhaust converter would be considerably more than one million.

Catalysts are quite often provided in the form of pellets or granules, which are packed into a container to make a catalyst bed through which the product to be reacted flows (e.g. a hydrazine monopropellant or automobile exhaust gases). One problem associated with such catalyst beds is that of low thermal conductivity. Since the granular or pelletized catalyst usually consists of an active metal deposited on an oxide ceramic carrier, there is low thermal conductivity caused by the insulating properties of the ceramic carrier and by the small contact area between the granules. This may result in hot spots in the bed, high thermal gradients through the bed, and in the case of a monopropellant reactor deep penetration of liquid, unvaporized propellant into the catalyst bed. Another problem associated with low thermal conductivity in the catalyst bed is that of ignition delays and pressure spikes associated with cold starts of a monopropellant reactor. To alleviate this, it is required to heat the catalyst bed, and of course lower thermal conductivity makes this more difficult.

Yet another problem associated with prior art catalyst beds is that the particles making up the catalyst bed tend to shrink because of high temperature and also because of attrition and spalling. When a small void is formed in the catalyst bed, the catalyst granules become free to move about and achieve significant speeds with each pressure pulse which passes through the bed. This results in accelerated attrition by abrasion and breaking of granules. In addition to catalyst granular motion caused by pressure pulsations, the catalyst bed is also subject to external vibrations of the catalyst reactor due, for example, to vibrations of a launch vehicle in a space application, or due to road vibrations in the case of an automobile. It has been attempted in the prior art to hold the granules in place by installing a spring loaded piston to compensate for the decrease in catalyst bulk volume. However, such springs often lose their resilience after prolonged exposure to high temperature at which catalytic reactors usually operate.

The prior art contains a variety of suggestions as to the various substrates that may be used for the catalyst material, such as bars, balls, chain, mesh, plates, saddles, sheet, tubes, wire, steel wool, etc. There have also been suggestions in the prior art that a foam metal may be suitable as a catalyst material. However, to the best knowledge of the applicant, most of the prior art disclosures relating to catalysts deal with the effectiveness of the catalyst material itself and make little distinction as to the advantages or effectiveness of the physical arrangement or construction of the catalyst or the structure associated therewith. Typical of such prior art disclosures are those contained in the following U.S. patents: Houdry, U.S. Pat. No. 2,742,437; Sill, U.S. Pat. No. 3,135,703; Rose, U.S. Pat. No. 3,147,592; Cohn et al, U.S. Pat. No. 3,197,955; Leak et al, U.S. Pat. No. 3,231,520; Webb, U.S. Pat. No. 3,298,182; Grant, Jr., et al, U.S. Pat. No. 3,303,651; Hall, U.S. Pat. No. 3,377,140; Talsma, U.S. Pat. No. 3,397,154; Tope et al, U.S. Pat. No. 3,421,826; Kearby, U.S. Pat. No. 3,423,194; Innes, U.S. Pat. No. 3,438,721; Keith et al, U.S. Pat. No. 3,441,381; Barber et al, U.S. Pat. No. 3,495,950; Sowards, U.S. Pat. No. 3,502,596; Friant et al, U.S. Pat. No. 3,507,627; Berger, U.S. Pat. No. 3,533,753; Keith et al, U.S. Pat. No. 3,565,830; and Keith et al, U.S. Pat. No. 3,597,165.

SUMMARY OF THE INVENTION

The composite catalyst bed of the present invention comprises a three dimensional, substantially structurally rigid, foam metal matrix, comprising a network of interconnected ligaments which define a plurality of interconnected pores, and a plurality of catalyst particles positioned in the pores of the matrix in a manner that the relative movement of the particles is restrained by the matrix. In the preferred form, the catalyst particles are packed rather tightly in the foam metal matrix, with some of the particles actually being formed into the ligaments of the matrix. In one embodiment the composite catalyst bed is in a monopropellant catalytic reactor, and in another embodiment it is in a catalytic muffler to oxidize exhaust combustion products from an internal combustion engine.

In the method of the present invention for making such a composite catalyst bed, first a foam metal material is placed in an enclosure, and catalyst particles are poured into the foam metal. The foam metal with the catalyst particles are then vibrated so that the pores of the foam become substantially filled with the catalyst particles. After this a compressive force is applied to the foam metal and catalyst particle composite to compress the same and lodge the catalyst particles more firmly in the foam metal matrix.

The size of the catalyst particles relative to the pore size of the foam metal matrix is such that it is possible to shake or vibrate the catalyst particles into the pores of the foam metal, without the particles being so small that the particles do not remain adequately retained in the matrix. It has been found that with conventional catalyst granules being used, in which the out of round ratio of the catalyst particles is generally not greater than 1.3, the average diameter of the granules should be approximately one-quarter to one-fifth of the pore size of the foam metal. The thickness of the ligaments that make up the foam metal matrix is typically about one-tenth to one-twentieth of the cell diameter of the matrix, and thus is approximately one-half to one-quarter of the average catalyst granule diameter. With the ligaments themselves being hollow, the granules are more readily formed into the ligaments to improve the structural integrity of the composite structure.

In accordance with a further embodiment within the broader scope of the present invention, a matrix of a different character is provided, wherein the hollow interior of the ligaments are provided with a vaporizable material which permits the matrix to function as a heat pipe for better thermal conductivity in the composite catalyst bed. Thus in the hotter areas of the composite bed, the material within the ligaments would vaporize and travel through the internal passages of the matrix to condense on the cooler portions of the matrix for improved heat transfer throughout the catalyst bed.

In accordance with another embodiment, where the composite catalyst is used in a monopropellant reactor, exhaust gases from a pilot reactor are passed through passageways formed within the ligaments of the matrix so as to preheat the main reactor, without contaminating the main reactor with the exhaust gases from the pilot reactor.

Other features of the present invention will become apparent from the following detailed description.

DESCRIPTION OF THE PREFERRED EMBODIMENTS

Figure 1:
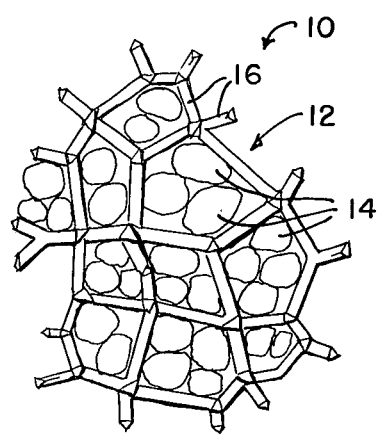
FIG. 1 is a view of a portion of the composite catalyst bed of the present invention.

With reference to FIG. 1, the composite catalyst bed of the present invention, generally designated 10 comprises a foam metal matrix 12, and a plurality of catalyst particles 14 contained therein. The foam metal matrix is a three dimensional network of interconnected ligaments 16. The catalyst particles 14 are or may be conventional catalyst pellets or granules which substantially fill the matrix provided by the foam metal 12.

Figure 2:
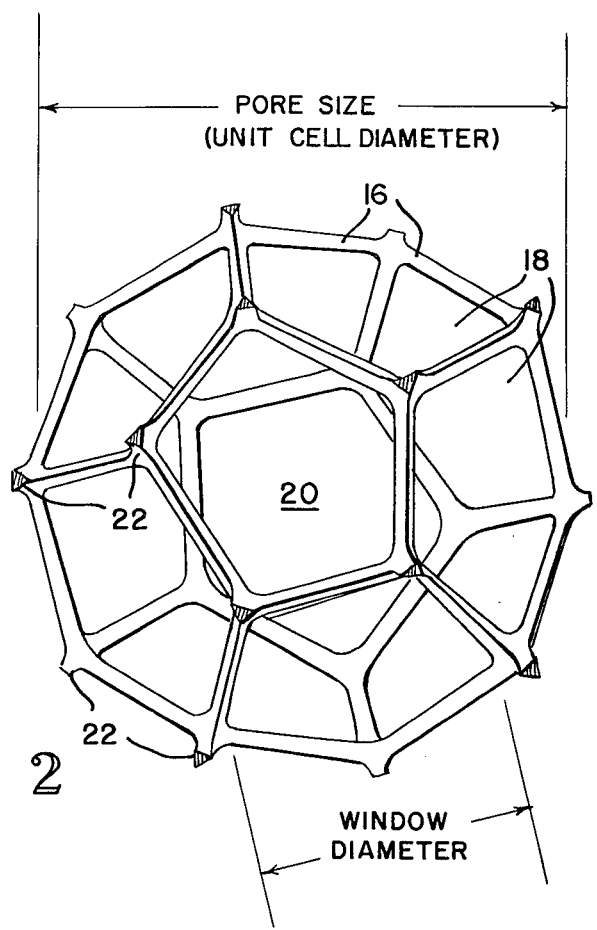
FIG. 2 is an isometric view illustrating the ideal cell structure of the foam metal material used to form the matrix of the composite catalyst bed.

FIG. 2 is an isometric view illustrating the cell structure of the foam metal used in the preferred embodiment of the present invention. Such foam metals are commercially available, for example, from Hogen Industries, in Willoughby, Ohio, and from Astro Met Associates, Inc. of Cincinatti, Ohio. Also, such foam metals have been discussed in the literature, for example, in an article entitled "Vibration Damping by Metallic Composite Foams" by Consuelo N. Hauser and Ray L. Hauser, appearing in a publication from the AIAA/ASME 9th Structures, Structural Dynamics and Materials Conference, Palm Springs, Calif., Apr. 1–3, 1968, AIAA Paper 68-339. Typically a unit cell of such foam has the over all configuration of a dodecahedron, with the individual ligaments 16 interconnected to form a plurality of pentagonal windows 18, with the cell defining a related pore, generally designated 20. The juncture points, also called nodes, at which the ligaments interconnect are designated 22.

The metal foam should be substantially structurally rigid so as to provide a matrix of adequate strength to contain the catalyst particles adequately. On the other hand, in the preferred form of the present invention, the foam metals should have sufficient ductility so that during the process of making the composite structure, as described hereinafter, the individual foam ligaments 16 are able to deform moderately to fit the contours of the catalyst granules or pellets 14 to form a tight composite structure. Also, to provide for thermal conductivity of the composite catalyst bed, the foam metal 12 should be made of a material that is a good heat conductor. Typical of the materials which are suitable for the foam metal are: nickel-200, Hastelloy-X, Haynes-25, Hastelloy-B, copper, cobalt, ruthenium, rhodium, palladium, osmium, iridium, platinum, rhenium, silver, iron, tungsten, vanadium, molybdenum, lanthanum, polonium-210, Curium-242, chromium, beryllium, and lead.

As mentioned above, the catalyst particles 14 are or may be conventional in and of themselves. Such catalyst particles are typically made of a ceramic carrier coated with an active metal which functions as the catalyst. Shell 405, which is made up of 32% iridium coated on 68% aluminum oxide would be suitable for use in the present invention. Other suitable candidates for use in the present invention are as follows: Reynolds HA-3, Reynolds H-7, Rocket Research Corporation LCH-101, Rocket Research Corporation LCH-202, or those manufactured by Oxy-Catalyst, Inc. of West Chester, Pa. and described in U.S. Pat. No. 2,742,437.

Figures 3, 4, 5:
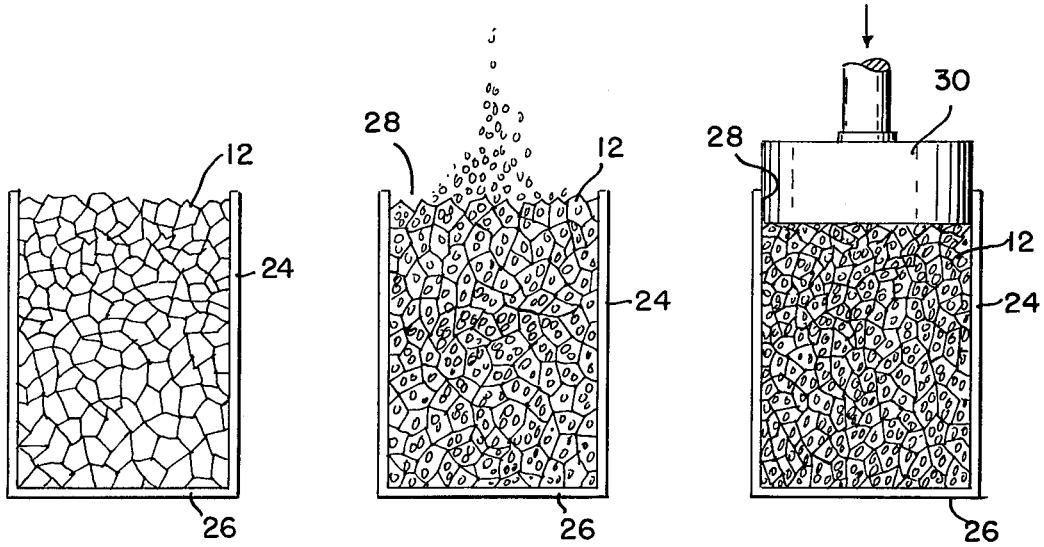
FIGS. 3, 4 and 5 are semi-schematic side elevational views with portions thereof shown in cross section, illustrating the process by which the composite structure of the present invention is made.

The process of the present invention is illustrated in FIGS. 3 through 5. In FIG. 3, a piece of foam metal 12 machined to the proper configuration is placed in a containing cylinder 24, with the bottom end of the cylinder 24 closed by a cap 26. As illustrated in FIG. 4, catalyst particles 14 are then poured into the open top end 28 of the cylinder 24 to fill the pores or voids of the foam metal 12. After this the container 24 is vibrated to cause the catalyst particles 14 to fill substantially all the voids of the foam metal 12.

Figure 6:
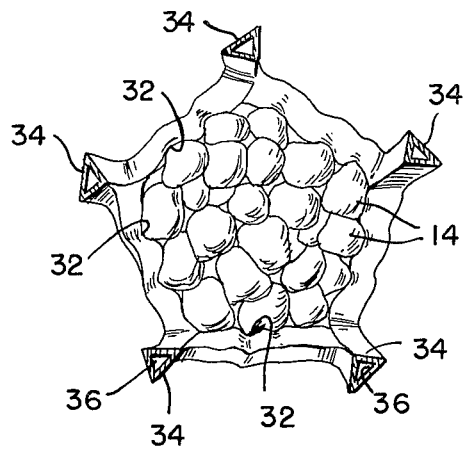
FIG. 6 is an enlarged view of one cell section of the composite structure formed by the process illustrated in FIGS. 3, 4 and 5.

As illustrated in FIG. 5, a compressive force is then applied to the foam metal catalyst composite 10 so as to compress the same. This can conveniently be accomplished by applying a piston 30 in the open top 28 of the cylinder 24 and pushing the piston against the composite of the foam metal 12 and particles 14. The amount of compressive force that is applied to the composite is dependent upon several factors. First, it is desirable that the compressive force be sufficient to actually compress or deform the ligaments 16 to fit the contours of the pellets 14. Thus, as shown in FIG. 6, which illustrates a unit cell of the composite catalyst bed 10 after compression, a number of the catalyst particles 14 actually have made indentations 32 in the walls of the ligaments 16. Typically, the commercially available foam metal used in the present invention has its individual ligaments 16 formed as hollow pieces of a triangular cross section. Thus, the actual wall structure 34 of the ligament 16 is able to deform inwardly into the hollow center portion 36 of the ligaments 16. The result is that the catalyst particles 14 are packed tightly against one another and also packed against the foam metal matrix 12. With the particles 14 being pushed into indentations in the ligaments 16 of the foam metal 12 and the foam metal being contoured against particles 14, the particles 14 become locked into the matrix 12 so as to restrain movement thereof. Also, analysis indicates that with the use of hollow ligaments 16 having a hollow interior, a substantially stronger structural skeleton is formed (i.e. in the order of more than 5% stronger) than would be the case if the solid ligaments were used. Yet there is a moderate decrease in the contact stress on the catalyst particles 13.

Figure 7:
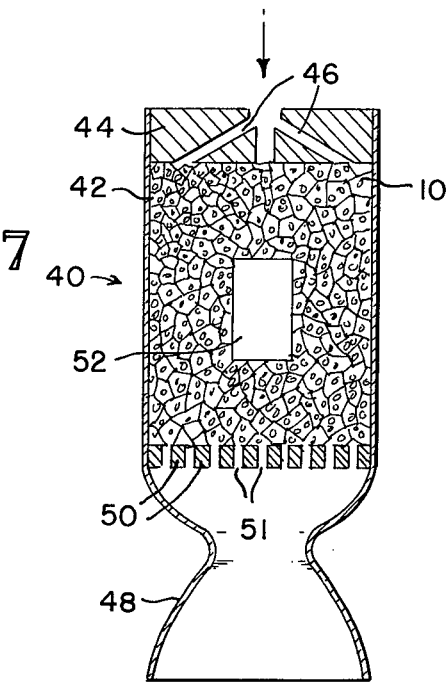
FIG. 7 is a longitudinal sectional view of a rocket type catalytic reactor utilizing the composite catalyst of the present invention.

In FIG. 7, the composite catalyst bed 10 of the present invention is shown in a typical rocket motor 40. This motor 40 comprises a casing 42 having an inlet end comprising a plate 44, having a number of monopropellant inlets 46, and a nozzle outlet 48. The composite catalyst bed 10 fills the casing 42 between the inlet plate 4 and an outlet retaining plate 50 having a plurality of outlet openings 51 therein. Located in the composite catalyst bed 10 is a heater 52 which is in intimate thermal contact with the foam metal of the composite catalyst bed 10, and could be, for example, an electric heater or a radioisotope. Alternately, the heater could be attached to or surrounding the outside reactor casing 42, or could direct electric current through the matrix 12, which would then function as a resistance heater.

In the operation of the rocket motor 40, the monopropellant is fed through the inlet openings 46 into the reactor bed 10, where it decomposes and passes as a gas through the openings 51 and out the nozzle 48. Although the composite catalyst bed 10 is subjected to high pressures in this reactor 40, the catalyst particles 14 are restrained from any appreciable movement, thus alleviating problems of abrasion of the catalyst particles. Further, since the foam metal matrix 12 conducts heat throughout the bed 10, the temperature throughout the composite 10 is more uniform, which improves the capability of the catalyst 14 to decompose the monopropellant, and prevents damaging hot spots from developing.

Figure 8:
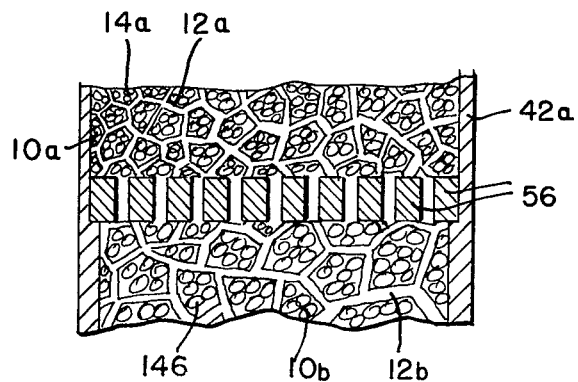
FIG. 8 is a fragmentary sectional view of a center portion of another rocket type catalytic reactor embodying the present invention.

FIG. 8 shows another embodiment of the present invention similar to that shown in FIG. 7. There is shown the middle portion of a casing 42a of a rocket motor, such as that shown in FIG. 7. However, the composite catalyst bed has two sections, an upstream section 10a and a downstream section 10b. The pore size of the foam metal matrix 12a and the size of the catalyst granules 14a that make up the bed 10a are smaller than the pore size of the matrix 12b and the catalyst particles 14b of the downstream composite 10b. There is a perforate plate 56 dividing these sections 10a and 10b, to which the ligaments of the matrixes 10a and 10b are intimately attached. This provides good thermal conductivity in both directions, upstream and downstream of the intermediate bed plate, between the upstream bed 10a and the downstream bed 10b.

Figure 9:
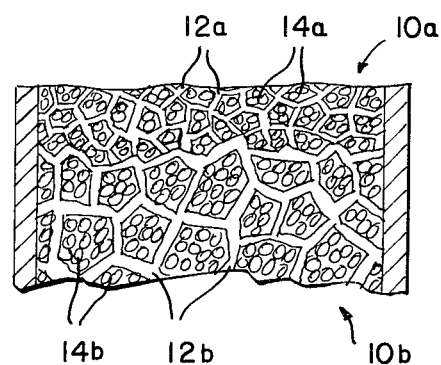
FIG. 9 is a view similar to FIG. 8, but showing yet a further modified form of a rocket type catalytic reactor.

A further embodiment is shown in FIG. 9, which also shows a center portion of a rocket motor. The same numerical designations as used in FIG. 8 are applied to the corresponding components shown in FIG. 9. Since these similarly designated components are substantially the same in the embodiments of both FIGS. 8 and 9, no further description of these will be included with reference to FIG. 9. The essential difference of the apparatus of FIG. 9 is that the perforate dividing plate 56 of the rocket motor of FIG. 8 is not utilized in that of FIG. 9. Since the composite beds 10a and 10b have the catalyst particles 14a and 14b embedded in the composite so that movement of the particles 14a and 14b are restrained, the plate 56 is not employed to retain the catalyst particles 14a and 14b in their respective locations. The matrix 12a is intimately interconnected with the matrix 12b to insure thermal conductivity in the upstream-downstream direction.

Figure 10:
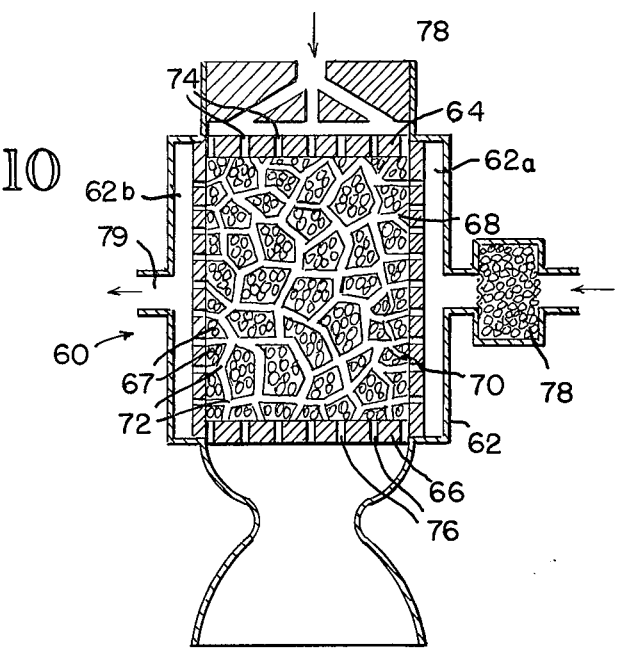
FIG. 10 is a view similar to FIG. 7 illustrating a further embodiment of the present invention.

FIG. 10 shows a further embodiment of the present invention. There is a rocket motor 60 comprising a casing 62 having an inlet plate 64 and an outlet plate 66, and containing a plurality of catalyst particles 67 in a three dimensional matrix 68 of interconnecting ligaments 70. This maxtrix 68 is distinguished from those shown previously herein in that the interior of the ligaments 70 provide a network of interconnecting passageways 72, which provide a network of through passages extending from one side of the casing 62 to the other. There are a plurality of inlet openings 74 in the plate 64 and outlet openings 76 in the plate 66. On one side of the casing 62 is a pilot reactor 78 which leads into an inlet manifold 62a located on one side of the casing 62, which manifold 62a communicates directly with the passageway network 72 formed by the matrix 68. Hot exhaust gases from the pilot reactor 78 pass through the inlet manifold 62a, through the passageway network 72 of the ligaments 70, into an exhaust manifold 62b, and out an exhaust opening 79. These exhaust gases heat the matrix 68 which in turn heats the catalyst particles 67. There is an injection of a main fuel flow through inlet openings 74 and through the catalyst particles 67 to cause reaction of the main fuel, which passes as combustion gases out the outlet openings 76.

Figure 11:
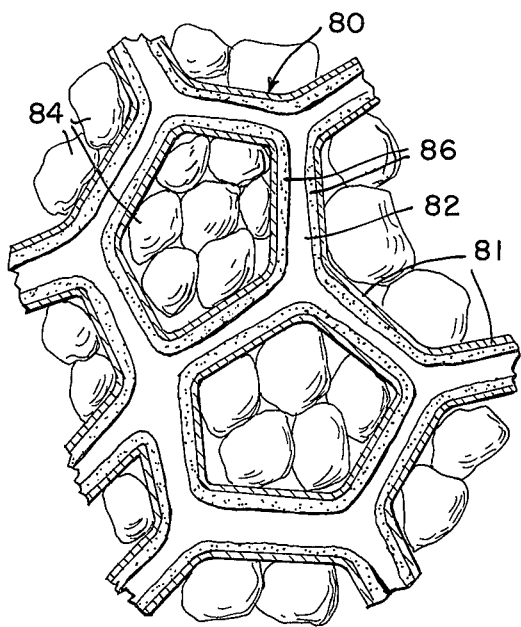
FIG. 11 is a view similar to FIG. 5, illustrating yet another embodiment of the present invention.

A yet further embodiment of the present invention is shown in FIG. 11. There is a three dimensional matrix 80 made up of a plurality of ligaments 81, with catalyst particles 84 being disbursed uniformly throughout the matrix 80. The interior of the ligaments 81 are provided with hollow passageways 82, the interior of which are coated with wick material 86 and contain a vaporizable liquid material, such as sodium, potassium, cesium, or mercury. The vaporizable liquid functions with the wick material 86 as a heat pipe to cause heat transfer from the hotter areas of the matrix 80, and thus insure moe uniform heat distribution throughout the composite catalyst bed. That is to say, in the hotter areas, there is vaporization of the liquid, with the vapor condensing on the cooler portions of the interior of the ligaments 81 and traveling as a liquid through te wick material 86 back to the hotter area of vaporization.

Figure 12:
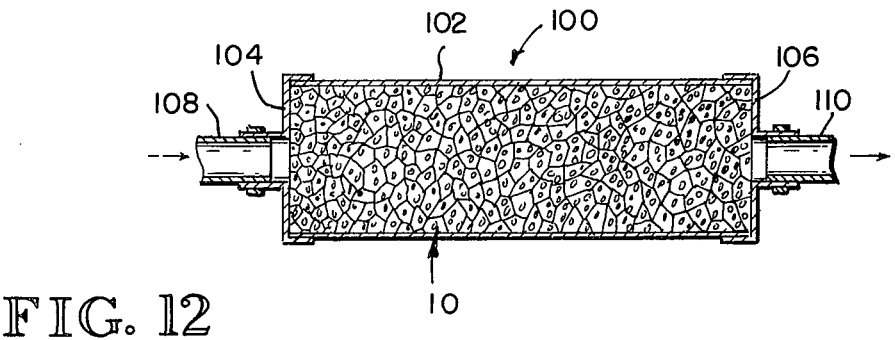
FIG. 12 is a longitudinal sectional view of the composite catalyst bed of the present invention being employed in a catalytic muffler for an automobile.

FIG. 12 shows a catalytic muffler 100 comprising a composite catalyst bed 10, such as shown in FIG. 1. This muffler comprises a tubular casing 102, having inlet and outlet end members 104 and 106, respectively. An exhaust pipe 108 delivers exhaust combustion products or gases to be treated into the muffler 100, and a tail pipe 110 delivers the treated gases to the atmosphere. Reference is made to U.S. Pat. Nos.

3,227,659; 3,362,783 and 3,495,950 for examples of suitable catalysts for treatment of internal combustion engine exhaust gases. The disclosures of these patents are incorporated herein by this reference. As in the embodiment of FIG. 8, the matrix of the composite bed 10 retains the catalyst particles in place to resist movement of the catalyst particles against the pressure pulses resulting from operation of the engine. Also, as in the previous embodiments, the matrix provides heat transfer in the bed 10 to provide more uniform temperature and hence better operation of the catalyst.

EXAMPLE I

To demonstrate the manner of loading the foam metal matrix with catalyst particles, a cylindrical piece of nickel foam, 4.4 cm diameter by 5.1 cm length with 1 mm nominal pore size was fitted into a transparent piece of plastic tubing and the bottom and capped. The void content of the foam was 97.6%. Shell 405 catalyst, 25–30 mesh granules were filled into the foam while simultaneously vibrating it. The loading efficiency was 83.8% of the amount of catalyst which would have been contained in the plastic tube without foam in it. Through the wall of the tube the quality of filling all foam pores could be observed and no voids were detected. A similar experiment was conducted with a coarser (1.5 mm nominal pore size) Haynes-25 foam. The loading efficiency in this experiment was even higher, 87.5%.

EXAMPLE II

A series of six nickel foam cylinders, 27 mm diameter with heights varying from 7.9 to 8.5 mm, with a nominal pore diameter of 3.5 mm and 97% void, were loaded with 25–30 mesh granular Shell 405 catalyst and compacted to a uniform height of 7.7 mm. This test was performed to determine the amount of compression needed to firmly lodge the catalyst particles in the foam matrix structure. After removing the compacted sample from the test fixture, it was placed on a vibrator for 60 seconds and the amount of catalyst retained weighed. The following Table I shows the results of of this test. Very good catalyst retainment was achieved at 0.5 mm overpack with only a minimal amount of fines generated.

TABLE I 25-30 Mesh Catalyst Retained In Foam Matrix After Compression And Vibration

| Overpack, mm | % Catalyst retained |
|---|---|
| 0.125 | 0.0 |
| 0.250 | 0.0 |
| 0.375 | 10.3 |
| 0.500 | 41.8 |
| 0.625 | 45.1 |
| 0.750 | 73.5 |

EXAMPLE III

A 22 N (0.5 lbf) thrust hydrazine monopropellant engine, model MR-50A, the design of which has been described in the open literature (such as American Institute of Aeronautics and Astronautics Paper 70-654, June, 1970), was chosen to demonstrate the superiority of the catalyst bed of the present invention over conventional designs.

The monopropellant engine consisted of the thrust chamber body, a lower bed plate, a lower bed catalyst, an intermediate bed plate, an upper bed catalyst and a cup-shaped injector cylinder. During normal assembly, the latter three parts were connected in a subassembly first by filling the upper bed catalyst into the injector cylinder with vibrating and tapping and then welding the intermediate bed plate to the injector. The upper bed subassembly was inserted into and welded to the thrust chamber body after the lower bed had been packed in a similar fashion.

The specific manner in which the above procedure was accomplished is as follows: One nickel foam piece, 27 mm (1.07 inch) diameter and 8 mm (0.315 inch) height with 2.3% density was fitted into the injection cylinder. Six grams of 25–30 mesh Shell 405 catalyst granules were then loaded into the foam injector structure by vibrating and tapping on the side of the loading fixture until the catalyst filled the injector cylinder uniformly throughout. A loading efficiency of 85% was achieved, compared to a loading efficiency of 100% which would have been achieved without the foam occupying part of the upper bed volume. The intermediate bed plate was then inserted and clamped down by tightening a series of bolts. The overpack in this case was 3% resulting in tightly wedging of catalyst particles between foam ligaments without crushing of catalyst particles. (with this overpack the injector cup could have been inverted without losing the majority of the catalyst. This has already been demonstrated in EXAMPLE II.) The intermediate bed plate was then welded to the injector to complete the upper bed subassembly.

The upper bed was then inserted into the thrust chamber body into which eighteen grams of 14–18 mesh Shell 405 catalyst had been loaded and vibrated as a lower bed, however without a metal foam inserted. (Most catalyst attrition occurs in the upper bed and so the composite catalyst bed of the present invention was placed in the upper area of the reactor, where it would be exposed to a maximum of wear.) The injector cylinder and the thrust chamber were welded together, a thrust chamber valve attached, and tested with hydrazine propellant in a vacuum chamber under simulated space conditions.

The duty cycle to which the engine was subjected included 150 pulses with pulse lengths of 0.022 and 100 seconds, and duty cycles varying from 0.2% to steady state. (Loss of catalyst in the upper bed is usually indicated while testing is in progress by pressure excursions during startup, more than 150% of nominal steady state chamber pressure, and chamber pressure fluctations, "roughness".) Throughout testing, the pressure chamber roughness was monitored by pressure transducers. The chamber pressure traces indicated that chamber pressure fluctuations in the engine were considerably less than in comparable engines previously tested with prior art catalyst arrangements. The bed loading during the nominal duty cycle dropped as scheduled from 0.027 lbm/in$^2$ seconds to 0.016 lbm/in$^2$ seconds simulating a blowdown feed system.

Following the test, the engine was disassembled and the upper bed inspected for potential catalyst damage. Most of the Shell 405 granules were still held in place and could not be removed by shaking the injector. Only immediately opposite the injector orifice some granules had been attrited away. This demonstrated that the foam matrix/granular catalyst composite bed would survive engine environmental conditions.

EXAMPLE IV

An engine identical to one described in Example III, except with a 3.0% density open cell nickel foam, was assembled in a similar fashion and tested to a more demanding duty cycle. The majority of this duty cycle consisted of 0.022 second pulses, interspersed with test sequences ranging from 0.022 second to 100 sec pulses and duty cycles from 0.02% to steady state. The chamber pressure-time curve was recorded and integrated for selected pulses and the thrust was calculated therefrom, knowing the throat area and the propellant flow rate. (The MR-50 engine is considered to be out of specification limits if due to catalyst degradation the thrust, i.e. nominal thrust of 220 psi feed pressure, has dropped below 82% of the nominal thrust, i.e. 5 lbf.)

In this particular test, 284,000 pulses were accumulated with only 5% loss of performance (i.e. thrust), whereas two conventional engines, identical to the one described above except with conventional catalyst of arrangement, had degraded to 70% of their nominal thrust after only 80,000 pulses were accumulated on each engine.

The test proved that due to the foam matrix catalyst bed of the present invention, the useful life of the engine could be more then tripled for this particular duty cycle.

What is claimed:

1. A composite catalyst bed comprising:
   a. a three dimensional, structurally rigid foam metal matrix, comprising a network of interconnected ligaments which define a plurality of interconnected pores, and
   b. a plurality of separate pellet-like catalyst carrying particles, each comprising a supporting carrier material that carries a catalyst material, and positioned in and filling the pores of such matrix, with relative movement of said particles being restrained by said matrix.

2. The catalyst bed as recited in claim 1, wherein said matrix is a thermally conductive material, whereby more uniform heat distribution throughout said composite bed is achieved.

3. The catalyst bed as recited in claim 1, wherein said catalyst particles are contoured into said ligaments, whereby retention of said catalyst particles in said matrix is enhanced.

4. The catalyst bed as recited in claim 3, wherein ligaments of said matrix are hollow, whereby the catalyst particles are better contoured into said ligaments.

5. The catalyst bed as recited in claim 1, wherein said matrix has a predetermined pore size, which is approximately four to five times as great as the diameter of said catalyst particles.

6. The catalyst bed as recited in claim 5, wherein the ligaments of said matrix have a width dimension of approximately one tenth to one twentieth of the pore size of the matrix.

7. The catalyst bed as recited in claim 6, further comprising a thermally conductive housing containing said composite bed, with the matrix being in intimate contact with said housing to insure proper thermal conductivity therewith.

8. The apparatus as recited in claim 7, wherein said housing has an inlet for a fluid to be reacted in said catalyst bed and an outlet, and said catalyst bed has at least two sections, one section near the inlet having a relatively small pore size of the matrix and particle size of the catalyst, and a second section near the outlet having a relatively larger pore size of the matrix and particle size of the catalyst.

9. The apparatus as recited in claim 8, wherein there is a perforate plate means positioned between said two catalyst sections, with the foam metal matrix of the two catalyst section being connected to said plate to accomplish thermal conductivity between the two catalyst sections.

10. The apparatus as recited in claim 8, wherein the matrix of the first section is intimately connected to the matrix of the second section to insure proper thermal conductivity between said first and second sections.

11. The composite bed as recited in claim 1, wherein said matrix is made of a material selected from a group consisting of nickel, cobalt, iron, ruthenium, rhodium, palladium, osmium, iridium, platinum, copper, silver, manganese, rhenium, chromium, molybdenum, tungsten, vanadium, lanthanum, beryllium, lead, polonium-210, curium-242, and combinations thereof.

12. A process for making a composite catalyst bed, comprising:
    placing a three dimensional, structurally rigid foam metal matrix in a containing means,
    placing a plurality of separate pellet-like catalyst particles, each comprising a support carrier material that carries a catalyst material, within said matrix so as to substantially fill the matrix, and
    applying a compressive force to said matrix and catalyst particles to cause the surfaces of the catalyst particles and the matrix to conform to each other more closely so that the catalyst particles are better retained in the matrix.

13. The process as recited in claim 12, wherein prior to compressing said matrix and catalyst particles, said matrix said catalyst paraticles are vibrated to insure proper distribution of the catalyst particles in the matrix.

14. The process as recited in claim 12, wherein said catalyst particles have a diameter approximately one-fourth to one-fifth of the pore size of said foam metal matrix.

15. The process as recited in claim 12, wherein said matrix with the catalyst particles therein is compressed between about 1 to 20 percent.

16. The process as recited in claim 15, wherein said matrix with the catalyst particles therein is compressed between about 3 to 4 percent.

17. The process as recited in claim 12, wherein:
    a. the percentage of voids in bulk volume of said foam metal matrix is between about 80 to 98 percent,
    b. the diameter of the catalyst particles is approximately one-fourth to one-fifth the pore size of the foam metal, and
    c. the foam metal with the catalyst particles therein is compressed in volume between about 3 to 4 percent.

18. The process as recited in claim 12, wherein said foam metal matrix is made of a material more ductile than said catalyst particles, wherein said catalyst particles form into said foam matrix during the compression of the foam metal matrix and the catalyst particles therein.

19. The process as recited in claim 18, wherein said foam metal matrix comprises hollow ligaments to enhance the forming of the particles into the matrix.

20. A monopropellant reactor comprising:

A. a housing defining a chamber and having an inlet means for injecting a monopropellant into the chamber and an outlet for discharge of products of decomposition therefrom, and b. a composite catalyst bed positioned in said chamber, said composite bed comprising:
1. a three dimensional, structurally rigid foam metal matrix, comprising a network of interconnected ligaments which define a plurality of interconnected pores, and
2. a plurality of separate pellet-like catalyst carrying particles, each comprising a supporting carrier material that carries a catalyst material, and positioned in and filling the pores of such matrix, with relative movement of said particles being restrained by said matrix.

21. The reactor as recited in claim 20, wherein said matrix is a thermally conductive material, whereby more uniform heat distribution throughout said composite bed is achieved.

22. The reactor as recited in claim 20, wherein said catalyst particles are contoured into said ligaments, whereby retention of said catalyst particles in said matrix is enhanced.

23. The reactor as recited in claim 20, wherein said matrix has a predetermined pore size, which is approximately four to five times as great as the diameter of said catalyst particles.

24. The reactor as recited in claim 20, wherein the ligaments of said matrix have a width dimension of approximately one-tenth to one-twentieth of the pore size of the matrix.

25. The reactor as recited in claim 20, wherein said matrix is intimately connected to said housing wall, to insure good thermal conductivity therewith.

26. The reactor as recited in claim 20, wherein there is a heater intimately connected to said foam metal matrix so as to be able to preheat said catalyst bed through said matrix.

27. The reactor as recited in claim 26, wherein said heater is an electric heater.

28. The reactor as recited in claim 26, wherein said heater is a radioisotope.

29. The reactor as recited in claim 26, wherein said heater is a source of electric current which passes electric current through said matrix which then becomes heated by such current.

30. The reactor as recited in claim 20, wherein said housing has an inlet for a fluid to be reacted in said catalyst bed and an outlet, and said catalyst bed has at least two sections, one section near the inlet having a relatively small pore size of the matrix and particle size of the catalyst, and a second downstream section near the outlet having a relatively larger pore size of the matrix and particle size of the catalyst.

31. The reactor as recited in claim 30, wherein there is a perforate plate means positioned between said two catalyst sections, with the foam metal matrix of the two catalyst sections being connected to said plate to accomplish thermal conductivity between the two catalyst sections.

32. The reactor as recited in claim 30, wherein the matrix of the first section is intimately connected to the matrix of the second section to insure proper thermal conductivity between said first and second sections.

33. The reactor as recited in claim 20, wherein said matrix is made of a material selected from a group consisting of nickel, cobalt, iron, ruthenium, rhodium, palladium, osmium, iridium, platinum, copper, silver, manganese, rhenium, chromium, molybdenum, tungsten, vanadium, lanthanum, beryllium, lead, polonium-210, curium-242, and combinations thereof.

34. A method of decomposing hydrazine based monopropellants which comprises flowing the monopropellant through a composite catalyst bed in pulse mode, wherein a large number of pressure pulses are exerted against said catalyst bed, wherein the catalyst bed comprises:
a. a three dimensional, structurally rigid foam metal matrix, comprising a network of interconnected ligaments which define a plurality of interconnected pores and
b. a plurality of separate pellet-like catalyst carrying particles, each comprising a supporting carrier material that carries a catalyst material, and positioned in and filling the pores of such matrix, with relative movement of said particles being restrained by said matrix, whereby with said matrix retaining said catalyst particles in proper position in said catalyst bed degradation of the catalyst particles is alleviated.

35. A catalytic muffler comprising:
a. a casing having an inlet through which engine exhaust gases are received and an outlet through which said exhaust gases are discharged,
b. a composite catalyst bed positioned in said casing, comprising:
1. a three dimensional, structurally rigid foam metal matrix, comprising a network of interconnected ligaments which define a plurality of interconnected pores, and
2. a plurality of separate pellet-like catalyst carrying particles, each comprising a supporting carrier material that carries a catalyst material, and positioned in and filling the pores of such matrix, with relative movement of said particles being restrained by said matrix.

36. The catalytic muffler as recited in claim 35, wherein said matrix is a thermally conductive material, whereby more uniform heat distribution throughout said composite bed is achieved.

37. The catalytic muffler as recited in claim 35, wherein said catalytic particles are contoured into said ligaments, whereby retention of said catalyst particles in said matrix is enhanced.

38. The catalytic muffler as recited in claim 35, wherein said matrix has a predetermined pore size, which is approximately four to five times as great as the diameter of said catalyst particles.

39. The catalytic muffler as recited in claim 35, wherein the ligaments of said matrix have a width dimension of approximately one-tenth to one-twentieth of the pore size of the matrix.

40. The catalytic muffler as recited in claim 35, further comprising a thermally conductive housing containing said composite catalyst bed, with the matrix being in intimate contact with said housing to insure proper thermal conductivity therewith.

41. The catalytic muffler as recited in claim 35, wherein said housing has an inlet for engine exhaust to be reacted is said catalyst bed and an outlet, and said catalyst bed has at least two sections, one section near the inlet having a relatively small pore size of the matrix and particle size of the catalyst, and a second section near the outlet having a relatively larger pore size of the matrix and particle size of the catalyst.

42. The catalytic muffler as recited in claim 41, wherein there is a perforate plate means positioned between said two catalyst sections, with the foam metal matrix of the two catalyst sections being connected to said plate to accomplish thermal conductivity between the two catalyst sections.

43. The catalytic muffler as recited in claim 41, wherein the matrix of the first section is intimately connected to the matrix of the second section to insure proper thermal conductivity between said first and second sections.

44. A method of oxidizing exhaust combustion products from an internal combustion engine comprising blowing the exhaust combustion products through a catalyst bed comprising:
  a. a three dimensional, structurally rigid foam metal matrix, comprising a network of interconnected ligaments which define a plurality of interconnected pores, and
  b. a plurality of separate pellet-like catalyst carrying particles, each comprising a supporting carrier material that carries a catalyst material, and positioned in and filling the pores of such matrix, with relative movement of said particles being restrained by said matrix, whereby with pressure pulses of said engine causing corresponding pressure pulses exerted on said catalyst bed, said catalyst particles are properly retained in the catalyst bed by the foam metal matrix.

45. A catalytic reactor, comprising:
  a. a casing defining a chamber and having a first set of inlet openings and a first set of outlet openings,
  b. a matrix positioned in said chamber and comprising a three dimensional network of interconnected ligaments having interconnected internal passageways forming a passageway network communicating with said first inlet openings and first outlet openings,
  c. a plurality of separate pellet-like catalyst carrying particles, each comprising a supporting carrier material that carries a catalyst material, and positioned in said chamber within said matrix,
  d. second inlet and outlet means arranged to direct a reacting fluid through said catalyst particles, and
  e. means to direct a heating fluid through said first inlet means and through said passageway network to heat said matrix and in turn heat said catalyst particles, whereby proper reaction of said reacting fluid in said chamber is accomplished.

46. A composite catalyst bed comprising:
  a. a three dimensional matrix comprising a network of interconnected ligaments, having internal passageways forming a network of interconnected passageways, said passageways having a wick material therein and a vaporizable liquid, with said vaporizable liquid and wick material functioning as a heat pipe to conduct heat from one portion of said matrix to another, and
  b. a plurality of separate pellet-like catalyst carrying particles, each comprising a supporting carrier material that carries a catalytic material, and positioned within said matrix, with said matrix conducting heat from higher temperature areas of said composite catalyst bed to lower temperature areas thereof.

* * * * *

UNITED STATES PATENT OFFICE
CERTIFICATE OF CORRECTION

Patent No. 4,027,476                    Dated June 7, 1977

Inventor(s)   Eckart W. Schmidt

It is certified that error appears in the above-identified patent and that said Letters Patent are hereby corrected as shown below:

Column 2, line 49, after "foam" insert - - metal - - .

Column 5, line 19, "5%" should be - - 50% - - .

Column 5, line 29, "plate 4" should be - - plate 44 - - .

Column 6, line 56, "moe" should be - - more - - .

Column 6, line 60, "te" should be - - the - - .

Column 7, line 18, "and" (second occurrence) should be - - end - - .

Column 7, line 42, "of" (second occurrence) should be deleted.

Column 8, line 12, "injection" should be - - injector - - .

Column 9, line 61, after "composite" insert - - catalyst - - .

Column 10, line 26, "support" should be - - supporting - - .

Column 10, line 36, "said" should be - - and - - .

Column 12, line 63 "is" should be - - in - - .

UNITED STATES PATENT OFFICE
CERTIFICATE OF CORRECTION

Patent No. 4,027,476   Dated June 7, 1977

Inventor(s) Eckart W. Schmidt

It is certified that error appears in the above-identified patent and that said Letters Patent are hereby corrected as shown below:

Column 14, line 29, "catalytic" should be -- catalyst --.

Signed and Sealed this twenty-third Day of August 1977

[SEAL]

Attest:

RUTH C. MASON
Attesting Officer

C. MARSHALL DANN
Commissioner of Patents and Trademarks